US006681500B2

(12) United States Patent
Moretti

(10) Patent No.: US 6,681,500 B2
(45) Date of Patent: Jan. 27, 2004

(54) VAPOR-PERMEABLE WATERPROOF SOLE FOR SHOES

(75) Inventor: Mario Polegato Moretti, Crocetta Del Montello (IT)

(73) Assignee: Geox S.p.A., Montebelluna (IT)

( * ) Notice: Subject to any disclaimer, the term of this patent is extended or adjusted under 35 U.S.C. 154(b) by 0 days.

(21) Appl. No.: 09/742,073

(22) Filed: Dec. 22, 2000

(65) Prior Publication Data

US 2001/0003875 A1 Jun. 21, 2001

Related U.S. Application Data

(63) Continuation of application No. PCT/EP99/04220, filed on Jun. 17, 1999.

(30) Foreign Application Priority Data

Jun. 25, 1998 (IT) .......................................... PD98A0157

(51) Int. Cl.⁷ ................................................ A43B 7/06
(52) U.S. Cl. .......................................... 36/3 B; 36/30 R
(58) Field of Search ........................ 36/3 B, 3 R, 30 R, 36/28, 29, 59 A, 32 R, 25 R, 35 B, 37, 103

(56) References Cited

U.S. PATENT DOCUMENTS

| 1,932,557 | A | * | 10/1933 | Meucci ........................ 36/3 R |
| 1,981,300 | A |   | 11/1934 | Berg |
| 2,185,762 | A | * | 1/1940 | Cox ............................ 36/8.1 |
| 2,751,692 | A |   | 6/1956 | Cortina |
| 3,256,621 | A | * | 6/1966 | Linton ......................... 36/3 B |
| 4,290,211 | A |   | 9/1981 | Csengeri |
| 4,408,401 | A | * | 10/1983 | Seidel et al. .................. 36/3 B |
| 4,445,284 | A |   | 5/1984 | Sakutori |
| 4,451,994 | A | * | 6/1984 | Fowler .......................... 36/28 |
| 4,819,345 | A |   | 4/1989 | Mulcahy et al. |
| 4,912,858 | A | * | 4/1990 | Mochizuki ..................... 36/3 B |
| 5,014,449 | A | * | 5/1991 | Richard et al. ................ 36/114 |
| 5,044,096 | A | * | 9/1991 | Polegato ....................... 36/3 R |
| 5,147,589 | A | * | 9/1992 | Chang et al. ................ 264/45.1 |
| 5,598,644 | A | * | 2/1997 | Polegato ....................... 36/3 B |
| 5,619,809 | A | * | 4/1997 | Sessa .......................... 36/3 R |
| 5,983,524 | A | * | 11/1999 | Polegato ....................... 36/3 R |
| 6,305,100 | B1| * | 10/2001 | Komarnycky et al. ......... 36/3 R |

FOREIGN PATENT DOCUMENTS

| DE | 296 20 436 | 2/1997 |
| EP | 0 728 424 | 8/1996 |
| FR | 2 495 447 | 6/1985 |
| GB | 2 290 016 | 12/1995 |
| WO | WO 97/14326 | 4/1997 |

* cited by examiner

Primary Examiner—J. Mohandesi
(74) Attorney, Agent, or Firm—Oblon, Spivak, McClelland, Maier & Neustadt, P.C.

(57) ABSTRACT

A vapor-permeable and waterproof sole for shoes, comprising:

a lower flat element made of shaped rubber-like material, which has a hollow upper region delimited by a border with air passage openings which extend laterally with respect to the ground resting plane;

an upper element;

a membrane made of waterproof and vapor-permeable material, which is interposed between said lower and upper elements at said hollow region;

said lower and upper elements and said membrane being joined hermetically in the perimetric regions of mutual contact.

12 Claims, 3 Drawing Sheets

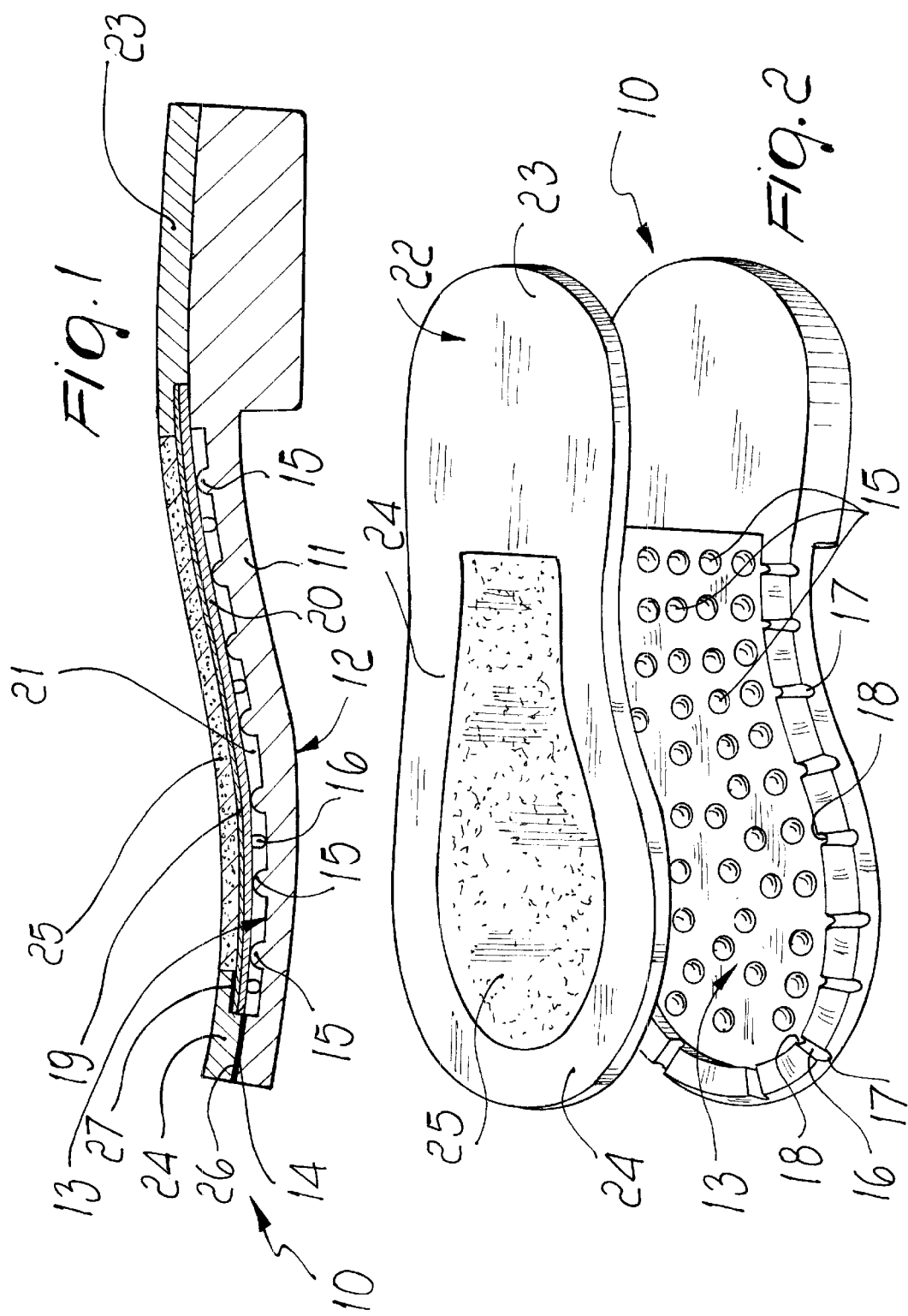

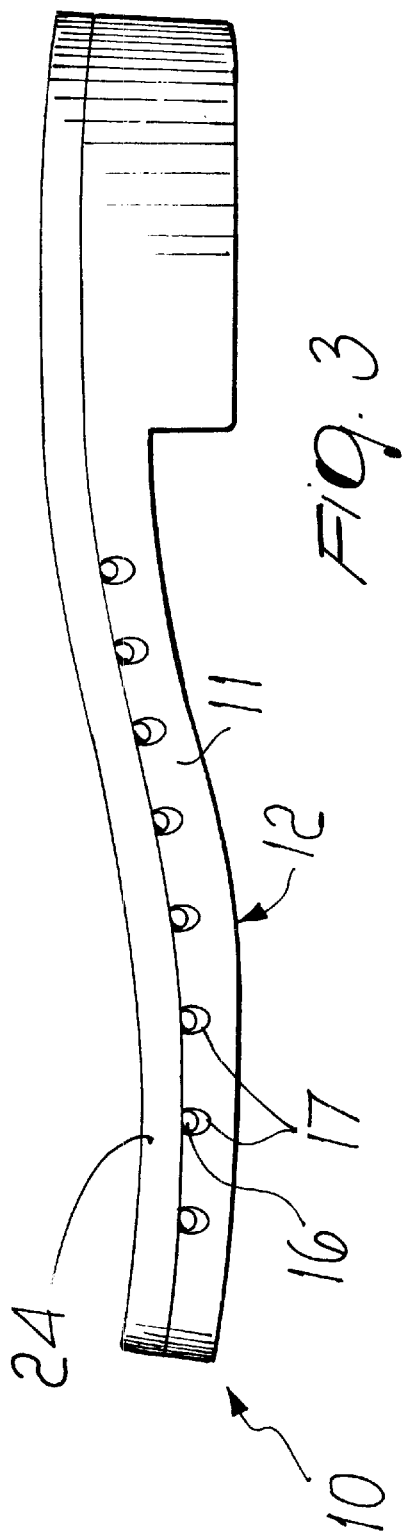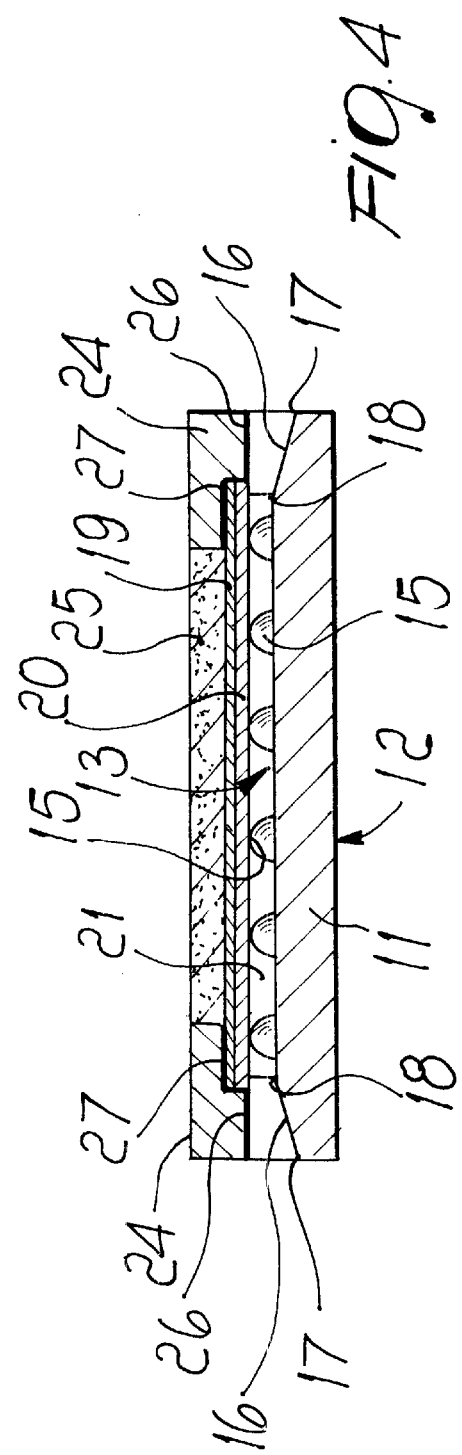

VAPOR-PERMEABLE WATERPROOF SOLE FOR SHOES

CROSS-REFERENCE TO RELATED APPLICATIONS

This application is a continuation of application No. PCT/EP99/04220 filed on Jun. 17, 1999.

BACKGROUND OF THE INVENTION

The present invention relates to a vapor-permeable waterproof sole for shoes.

Conventional shoes with rubber soles are widely commercially available which are capable of ensuring a particular level of practicality and comfort which is appreciated most of all by young people and individuals engaged in sports; such soles, however, do not allow any transpiration of the foot.

As disclosed in Italian Patent no. 1,232,798 and in WO-A-97114326, shoes have long been known which have a rubber sole through which correct transpiration is ensured by virtue of an effective exchange of heat and water vapor between the environment inside the shoe and the outside environment. These rubber soles ensure at the same time the necessary watertightness with respect to external moisture and water.

These soles are in fact constituted by a tread made of perforated elastomer, above which a vapor-permeable and waterproof membrane is associated.

Subsequent improvements provide for the interposition of the vapor-permeable membrane between layers of protective material and/or fillers.

Shoes having such vapor-permeable soles have certainly constituted a considerable innovation with respect to what was available earlier.

On the other hand, it should be noted that practical drawbacks are observed in shoes produced with these vapor-permeable soles, due mainly to insufficient air circulation owing to the fact that the surface occupied by the perforations is much smaller than the total area of the sole.

It should also be observed that this insufficient air circulation is less than ideal also because the vapor-permeable membrane is substantially fully in contact with the rubber of the sole.

On the other hand, the number of perforations formed in the tread and their diameter must be limited in order to prevent pointed foreign objects, by entering through the perforations of the tread, from penetrating to the point of damaging or perforating the membrane.

The membrane is in fact continuously subjected to the compressive action of the foot, so that even an object which is not particularly pointed might cause damage without too much difficulty.

Reduced air circulation, on the other hand, makes it difficult to provide moisture exchange from the inside to the outside of the shoe, consequently reducing the transpiration through the membrane.

The amount of water vapor extracted from the shoe in fact increases with the rate at which the filler layer above the membrane dries, since it is the filler layer that collects the perspiration generated by the foot.

In order to increase air circulation, on the other hand, it would be necessary to increase the size of the perforated surface of the tread, with the result of a consequent increase in the vulnerability of the membrane.

It might also be possible to provide vapor-permeable rubber soles characterized by ventilation perforations in the tread which are inclined with respect to the ground resting plane.

With such a configuration of the tread, the membrane would be better protected against any punctures caused by pointed objects penetrating through the perforations.

However, in the practical production of such treads, which must be manufactured by injecting plastic material in a mold, it would be necessary to provide suitable undercuts in the mold, entailing consequent great technical difficulties and considerable structural complexities.

A further drawback affecting shoes having vapor-permeable rubber soles is noted when the tread makes contact with wet ground, since mud very easily enters the perforations to the point of accumulating on the surface of the membrane, reducing its vapor permeability.

SUMMARY OF THE INVENTION

A principal aim of the present invention is to provide a vapor-permeable and waterproof sole for shoes which allows the exchange of heat and water vapor, so as to always ensure an optimum internal microclimate as a function of the external climate, improving currently available vapor-permeable soles by solving their above mentioned drawbacks.

Another important object of the present invention is to provide a sole which effectively protects the integrity of the vapor-permeable membrane while allowing adequate air circulation.

Another very important object of the present invention is to provide a sole for shoes which is capable of keeping the inside of the shoe dry even in the presence of condensation of the water vapor produced by transpiration due to excessive external humidity.

Another object is to provide a sole in which the deposition of dirty material on the vapor-permeable membrane is prevented.

Another object of the present invention is to provide a vapor-permeable and waterproof sole whose structure can be easily adapted to the most disparate shoes, both for everyday use and for sports use.

Another object of the present invention is of provide a sole for shoes whose cost is substantially comparable to the costs of currently conventional soles.

Another object of the present invention is to provide a vapor-permeable and waterproof sole which can be manufactured with technologies and equipment which are conventional in this field.

Another object of the present invention is to provide a vapor-permeable and waterproof sole which can be used to ensure adequate air circulation even in special shoes such as safety shoes.

In accordance with one preferred aspect of the invention, there is provided a vapor-permeable and waterproof sole for shoes, comprising: a lower flat element made of shaped rubber-like material; an upper element; a membrane made of waterproof and vapor-permeable material; said lower and upper elements and said membrane being joined hermetically in the perimetric regions of mutual contact;

the sole being characterized in that said lower element has a hollow upper region delimited by a border with air passage openings formed in said border which extend radially and connect the hollow region to the outside of the shoe, and said membrane being interposed between said lower and upper elements at said hollow region.

BRIEF DESCRIPTION OF THE DRAWINGS

The particular technical characteristics and advantages of the present invention will become apparent from the following detailed description of some embodiments thereof, illustrated only by way of non-limitative example in the accompanying drawings, wherein:

FIG. 1 is a sectional elevation view, taken along a longitudinal plane, of a sole according to the present invention in a first embodiment;

FIG. 2 is an exploded view of the sole of FIG. 1;

FIG. 3 is a side view of the sole of FIG. 1;

FIG. 4 is a sectional view, taken along a transverse plane, of the sole of FIG. 1;

DESCRIPTION OF THE PREFERRED EMBODIMENTS

Figure 5:
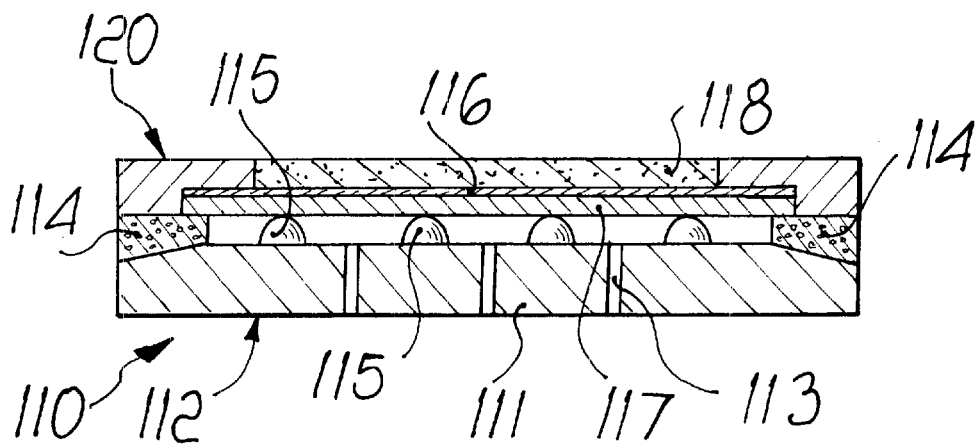
FIG. 5 is a sectional view similar to FIG. 4, taken along a transverse plane, of a sole according to the invention in a second embodiment.

With particular reference to the above described FIGS. 1 to 4, a vapor-permeable and waterproof sole according to the present invention is generally designated by the reference numeral 10 in a first embodiment.

The sole 10 comprises a shaped lower element 11 which is made of rubber-like material (i.e. organic rubber or any of various artificial polymeric substances) and which is preferably made of elastomer, and in which a tread 12 is integrated in the lower part; the lower element has, in its upper part, a hollowed-out or hollow region 13 delimited perimetrically by a border 14.

Dome-shaped raised portions 15 protrude from the bottom surface of the hollow region 13 and in this case are uniformly distributed and reach the same vertical level as the border 14.

Channels 16 are formed in particular in the border which extend substantially radially and connect the hollow region 13 to the outside of the of the sole.

Each one of the channels 16 is inclined with respect to the ground resting plane, so that the end that is in contact with the outside, designated by the reference numeral 17, is at a lower level than the other end, schematically designated by the reference numeral 18, which is in contact with the hollow region 13.

The sole 10 comprises a membrane 19 which is made of a waterproof and vapor-permeable material, such as those commercially available and commonly known by the trade name Gore-Tex, so that with a shoe having the sole 10, water is blocked by the membrane from entering the inside of the shoe while the membrane permits water transpiration therethrough from the inside of the shoe to the outside of the shoe.

In a preferred embodiment, a protective element 20 is coupled to the membrane at the face of the membrane that is directed toward the lower element 11 and is preferably constituted by a layer of a material which is water-repellent, vapor-permeable or perforated and resistant to hydrolysis.

The protective element 20 has the same dimensions as the membrane 19 and is suitable to be arranged, during assembly, directly above the hollow region 13, so as to rest on the raised portions 15 and thus form, in combination with the lower element 11, an air-filled chamber 21.

Moreover, the sole 10 comprises an upper shaped element 22, made of rubber-like material (i.e. organic rubber or any of various artificial polymeric substances) and preferably made of elastomer in this case, which is constituted by a flat portion 23 which is arranged at the heel and from which a rim 24 protrudes along the entire perimeter of the remaining profile of the sole 10.

In this embodiment, the rim 24 has a larger lateral cross-sectional extension than that of the border 14 of the lower element 11, as seen in FIG. 4.

Moreover, the sole 10 has a filler element 25 which is coupled to the upper face of the membrane 19 and occupies the free region of the upper element 22 which is delimited perimetrically by the rim 24.

The filler element 25, in particular, is constituted by a layer of a material which is vapor-permeable, or perforated at right angles to its resting plane, and whose thickness is substantially equal to the thickness of the rim 24, so as to constitute, in combination with the rim, a layer having uniform dimensions for the sole 10.

Thanks to the presence of the filler element 25, the perspiration that arrives from the inside of the shoe having the sole 10 is not blocked but is instead absorbed by the filler element in its gaseous state (water vapor).

In this regard, said filler element 25 can be conveniently constituted by vapor-permeable open-cell polyurethane foam combined with chemicals which convert liquid perspiration into a solid gel which is then dissolved by evaporation.

In this regard, it can be convenient to use the material commercially known as Dryz and manufactured by DICON TECHNOLOGIES of Fair Lawn, N.J., U.S.A..

In this way, the inside of the shoe in fact remains dry at all times, even if the water vapor produced by transpiration condenses due to excess humidity, since the water cannot pass through the membrane 19 and therefore cannot reach the foot of the user.

The membrane 19 is joined to the protective element 20 that lies below it so as to not compromise vapor-permeability, for example by using a hydrolysis-resistant adhesive with spot bonding.

In practice it is possible to use an easily commercially available adhesive known commonly as "hot merc" or, as an alternative, a calendered-powder system.

The upper element 22 is directly associated with the lower element 11 by applying a layer of sealant between the border 14 and the corresponding portion 26 of the rim 24, so as to make them monolithic and waterproof.

This coupling forms along the entire external profile of the sole 10 openings, constituted by the ends 18 of the channels 16, for connection between the outside and the air-filled chamber 21.

Correspondingly, in order to prevent the infiltration of humidity, the membrane 19 is sealed along its entire perimeter with the remaining portion 27 of the rim 24 that lies above it.

The seal can be ensured by spreading a hydrolysis-resistant adhesive or by high-frequency welding.

As an alternative, the upper element 22 can be produced by means of an overmolding process in a mold directly on the membrane 19.

Limiting the hermetic bond between the upper element 22 and the membrane 19 only to the perimetric portion 27 of the rim 24 allows to keep vapor-permeability unchanged over most of the surface of the membrane 19.

The sole 10 in fact has a central part, except for the lower element 11, which is totally free of any element that is impermeable to water vapor (not vapor-permeable).

For this reason, the protective element 20 is in fact generally made of a material which is capable of drying quickly, such as for example non-woven fabric or needle-loomed fabric.

The element 20 is also directed downward, i.e. toward the lower element 11, since it must protect the membrane 19 from the raised portions 15 on the air chamber 21.

In this constructive configuration, the protective element 20 can actually have a very modest thickness, since it acts as a simple support for the membrane 19.

In particular, the protective element 20 can be constituted by a simple fabric, thus increasing the vapor-permeable capacity of the membrane 19.

The air-filled chamber 21 is directly connected, through the membrane 19, to the upper part of the sole 10 and therefore, after assembly to an upper, to the inside of the resulting shoe.

In this way, therefore, the air-filled chamber 21 is constantly connected to the outside through the channels 16, which thus ensure perfect ventilation also by means of the pumping effect of the foot, which compresses the air-filled chamber 21.

Moreover, the inclination of the channels 16 facilitates the outflow of any liquids that manage to enter the air-filled chamber 21.

The ventilation assuredly provided to the air-filled chamber 21 by the channels 16 allows rapid elimination of perspiration from the upper part of the sole 10, through the membrane 19 and to the outside.

In practice it has been observed that the present invention provides a vapor-permeable and waterproof sole which ensures good exchange of heat and water vapor between the inside and the outside of the shoe, at the same time safeguarding total waterproofing and imperviousness to moisture and in particular completely protecting the integrity of the vapor-permeable membrane.

The lower element 11 on which the tread 12 is integrated is in fact not perforated and accordingly the sole 10 no longer runs the risk of having pointed bodies that penetrate to the point of damaging, or even perforating, the vapor-permeable membrane.

Another advantage of the present invention is that the above-described sole is capable of keeping the inside of the shoe dry even in the presence of condensation of the water vapor produced by transpiration when there is excessive humidity (100%) outside.

A further aspect of the present invention is that the structural configuration of the above-described sole is such as to prevent the accumulation of dirty material on the vapor-permeable membrane.

The present invention also provides a vapor-permeable and waterproof sole which can be easily adapted to shoes of different types, both for everyday use and for sports use.

The above-described sole also can be obtained at a cost which is comparable to the costs of conventional soles.

A particular advantage has been achieved by virtue of the fact that the vapor-permeable and waterproof sole can be manufactured with technologies and equipment which are conventional in the field.

It is also noted that the structure of the described sole is such that it can be used without any problem to ensure good air transpiration even for special shoes, such as for example safety shoes.

The shoes must in fact have soles which cannot be perforated and in which metallic protective laminae are often conveniently inserted.

The present invention is susceptible of numerous modifications and variations, all of which are within the scope of the same inventive concept.

With particular reference to FIG. 5, a vapor-permeable and waterproof sole, according to the present invention, is generally designated by the reference numeral 110 in a second embodiment and has a shaped lower element, now designated by the reference numeral 111, which is preferably made of elastomer in this case also and which may be made of any rubber-like material; a tread 112 is integrated thereon in the lower part.

The lower element 111 can optionally be provided with fine perforations.

The fine perforations 113 of the lower element 111 have a diameter of less than 1 mm and their number is extremely limited.

A rim 114 made of porous material is arranged along the perimetric border of the upper part of the lower element 111 and uniformly distributed raised portions 115 protrude from the internal region and reach the height of the rim 114.

The rim 114 made of porous material replaces in practice the channels 16 of the above-described sole 10.

A vapor-permeable membrane 116, interposed between a protective element 117 and a filler element 118, is superimposed on the lower element 111, so as to rest on the raised portions 115 and form, in combination with them, an air-filled chamber 119.

The sole 110 further comprises an upper contoured element 120 preferably made of elastomer or of any other rubber-like material which is fully equivalent to the preceding one designated by the reference numeral 22 and is joined hermetically, like the element 22, to the lower element 111 and to the membrane 116 along the entire perimetric band.

In this embodiment the air-filled chamber 119 is therefore connected to the outside through the rim 114 made of porous material, which prevents the penetration of dirt, allowing the ventilation of the membrane 116.

The presence of the fine perforations 113 in the lower element 111 allows to change the air in the chamber 119 without however affecting, owing to its minimal size, the integrity of the membrane 116 with respect to pointed objects and without allowing dirt to deposit.

Figure 6:
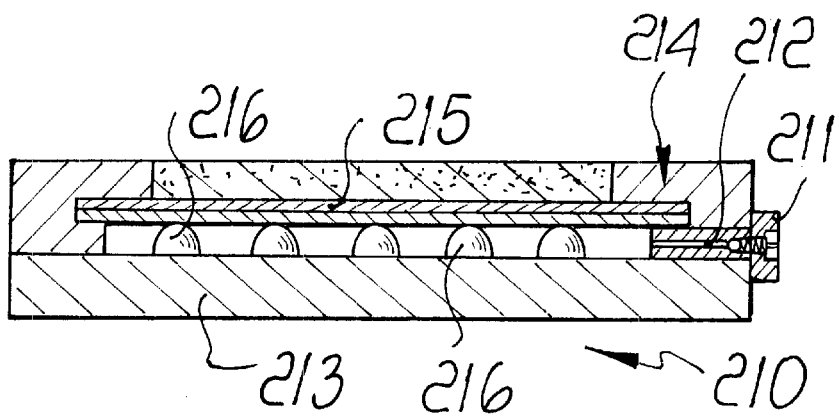
FIG. 6 is a sectional view similar to FIG. 4, taken along a transverse plane, of a sole according to the invention in a third embodiment.

With particular reference to FIG. 6, a vapor-permeable and waterproof sole in a third embodiment is designated by the reference numeral 210 and is provided with one-way valves 211 arranged in channels, now designated by the reference numeral 212, which are formed perimetrically by the coupling between the lower element 213 and the upper element 214.

In this constructive configuration, the number of the channels 212 provided with the one-way valves 211 is limited with respect to the number of the channels 16 of the above-described sole 10.

In this way, therefore, the compressive action of the foot on a membrane, now designated by the reference numeral 215, which rests on raised portions, now designated by the reference numeral 216, which protrude from the lower element 213 pumps out the air through the valves 211 and at the same time prevents the penetration of liquids or dirt from outside.

All the described details may be replaced with other technically equivalent elements.

The materials used, so long as they are compatible with the contingent use, and the dimensions may be any according to requirements.

The disclosure of Italian patent application No. PD98A000157, for which the present application claims priority, is incorporated herein.

What is claimed is:

1. A vapor-permeable and waterproof sole for shoes, comprising:

a lower element made of shaped rubber material, said lower element including:

a hollow region at an upper portion thereof, said hollow region being defined by a border having a predetermined width, said border having channels extending across said predetermined width thereof between first and second air passage openings formed in end surfaces of said border so as to allow for communication between said hollow region and an outside of said shoes, said channels being inclined downwardly from a bottom surface of said hollow region toward said outside of each of said shoes, and said first air passage opening, which is in contact with the outside of said shoe, being at a lower level than said second air passage opening, which is in contact with the hollow region; an upper element;

a membrane made of waterproof and vapor-permeable material, said membrane being interposed between said lower and upper elements at said hollow region prior to said lower and upper elements being joined hermetically to said membrane in perimetric regions of mutual contact, wherein said hollow region is internally provided with raised portions protruding upwardly from said lower element, and said raised portions are dome-shaped and said membrane is supported on a protective layer which is supported on said raised portions.

2. The sole according to claim 1, wherein said membrane is associated with a protective layer made of a material which has one or more of the characteristics of being water-repellent, vapor-permeable or perforated, and resistant to hydrolysis, said membrane and said protective layer located adjacent each other and arranged in a lower recessed portion of said upper element.

3. The sole according to claim 1, wherein said upper element is obtained by overmolding a compatible material on said membrane so as to provide sealing at said perimetric regions of mutual contact of said lower and upper elements with said membrane.

4. The sole according to claim 1, wherein said upper element comprises a perimetric rim and a vapor-permeable or perforated filler layer which occupies a free region of said upper element which is delimited by said perimetric rim, said upper element being superimposed on said membrane at one of said perimetric regions of mutual contact of said lower and upper elements with said membrane which is arranged adjacent said vapor-permeable or perforated filler layer.

5. The sole according to claim 4, wherein said vapor-permeable or perforated filler layer is made of open-cell polyurethane foam.

6. The sole according to claim 5, wherein said vapor-permeable or perforated filler layer is made of open-cell polyurethane foam combined with chemicals which convert liquid perspiration into a solid gel which is dissolved by evaporation.

7. The sole according to claim 2, wherein said protective layer is made of either a non-woven fabric or a needle-loomed fabric.

8. The sole according to claim 1, wherein said membrane is sealed, in an upward region, with said upper element in said perimetric regions of mutual contact of said lower and upper elements with said membrane, and with said lower element if said membrane is in contact with said lower element.

9. The sole according to claim 1, wherein said lower and upper elements are sealed in said perimetric regions of mutual contact with said membrane so as to form a monolithic assembly.

10. The sole according to claim 7, wherein said membrane and said protective layer are associated with each other by spot bonding with an adhesive which is resistant to hydrolysis and is of the type commonly known in the field as Hot Merc or with calendered powders.

11. The sole according to claim 1, wherein a hermetic bond between said lower element and said upper element is provided by gluing with hydrolysis-resistant adhesives or by high-frequency welding.

12. The sole according to claim 1, wherein said first and second air passage openings are of different sizes, said first air passage opening being located in said end surface of said border which is adjacent to said hollow region having a smaller diameter than said second air passage opening which is located in said end surface of said border which is adjacent said outside of said shoes.

* * * * *